US012107409B2

(12) United States Patent
Vanevenhoven

(10) Patent No.: US 12,107,409 B2
(45) Date of Patent: Oct. 1, 2024

(54) DIRECT CURRENT BUS CONTROL SCHEME

(71) Applicant: Hamilton Sundstrand Corporation, Charlotte, NC (US)

(72) Inventor: Jordan K. Vanevenhoven, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 152 days.

(21) Appl. No.: 17/749,319

(22) Filed: May 20, 2022

(65) Prior Publication Data

US 2023/0378743 A1 Nov. 23, 2023

(51) Int. Cl.
*H02H 3/087* (2006.01)
*B64D 41/00* (2006.01)
*H02J 1/00* (2006.01)
*H02M 7/02* (2006.01)

(52) U.S. Cl.
CPC ............ *H02H 3/087* (2013.01); *B64D 41/007* (2013.01); *H02J 1/00* (2013.01); *H02M 7/02* (2013.01); *B64D 2221/00* (2013.01); *H02J 2310/44* (2020.01)

(58) Field of Classification Search
CPC ......... H02H 3/087; B64D 41/007; H02J 1/00; H02J 2310/44; H02M 7/02
USPC .......................................................... 361/1
See application file for complete search history.

(56) References Cited

U.S. PATENT DOCUMENTS 8,587,146 B2 11/2013 Beneditz et al.
9,114,888 B2 8/2015 Swearingen et al.
11,133,672 B1 9/2021 Joyce et al.
11,996,690 B2* 5/2024 Vanevenhoven .... H02H 1/0007
2016/0280394 A1 9/2016 Radun et al.
(Continued)

FOREIGN PATENT DOCUMENTS

CN 113765211 A 12/2021
EP 2648322 A1 10/2013
EP 3883081 A1 9/2021

OTHER PUBLICATIONS

European Search Report for Application No. 23174373.3, mailed Oct. 20, 2023, 8 pages.
(Continued)

*Primary Examiner* — Yemane Mehari
(74) *Attorney, Agent, or Firm* — CANTOR COLBURN LLP

(57) ABSTRACT

Examples described herein provide an electric power distribution system (EPDS) that includes a transformer rectifier unit (TRU) that receives alternating current (AC) electric power from an AC electric power source during a first state of operation. The EPDS further includes a direct current (DC) electric power source that receives the DC electric power from the TRU during the first state of operation. The EPDS further includes a DC essential bus that receives the DC electric power from the DC electric power source during the first state of operation and that receives the DC electric power from another source during a second state of operation. The EPDS further includes a controller to selectively engage a diode bypass contactor to enable a diode during the second state of operation, and selectively engage the diode bypass contactor to enable a diode bypass during the first state of operation.

19 Claims, 4 Drawing Sheets

(56) References Cited

U.S. PATENT DOCUMENTS

| | | | |
|---|---|---|---|
| 2021/0044107 A1* | 2/2021 | Hopkins | G05F 1/46 |
| 2021/0292000 A1* | 9/2021 | Vanevenhoven | H02J 3/38 |
| 2021/0292001 A1* | 9/2021 | Vanevenhoven | B64D 41/007 |
| 2022/0269325 A1* | 8/2022 | Huang | H02M 7/217 |

OTHER PUBLICATIONS

Machine Translation for CN113765211, Published: Dec. 7, 2021, 19 pages.

* cited by examiner

DIRECT CURRENT BUS CONTROL SCHEME

BACKGROUND

One or more embodiments described herein relate to a scheme for controlling a direct current (DC) bus.

Aircraft use electric power distribution systems (EPDSs) to distribute electric power that is used to operate aircraft systems and/or components. For example, a generator generates electric power, which is distributed to aircraft systems and/or components, such as control systems, actuators, motors, electronics, and/or the like, including combinations and/or multiples thereof throughout the aircraft. The generator may be associated with a main engine of the aircraft, auxiliary systems (e.g., an auxiliary generator), and/or backup systems (e.g., a ram air turbine (RAT)). In some cases, the generator generates alternating current (AC) electric power, which is used by some aircraft systems and/or components. In some cases, the AC electric power can be converted to DC electric power, which is use by some other aircraft systems and/or components.

BRIEF DESCRIPTION

In one exemplary embodiment, an electric power distribution system is provided. The electric power distribution system (EPDS) includes a transformer rectifier unit (TRU) that receives alternating current (AC) electric power from an AC electric power source during a first state of operation. The EPDS further includes a direct current (DC) electric power source that receives the DC electric power from the TRU which is converted from the AC electric power during the first state of operation. The EPDS further includes a DC essential bus that receives the DC electric power from the DC electric power source during the first state of operation and that receives the DC electric power from another source during a second state of operation. The EPDS further includes a controller to selectively engage a diode bypass contactor to enable a diode disposed between the DC essential bus and the DC electric power source during the second state of operation, and selectively engage the diode bypass contactor to enable a diode bypass disposed between the DC essential bus and the DC electric power source during the first state of operation.

In addition to one or more of the features described herein, or as an alternative, further embodiments of the electric power distribution system may include the AC electric power source that generates the AC electric power.

In addition to one or more of the features described herein, or as an alternative, further embodiments of the electric power distribution system may include a TRU contactor disposed between the TRU and the DC electric power source.

4 In addition to one or more of the features described herein, or as an alternative, further embodiments of the electric power distribution system may include that the another source is a ram air turbine.

In addition to one or more of the features described herein, or as an alternative, further embodiments of the electric power distribution system may include that the AC electric power source is a first generator associated with a first gas turbine engine of an aircraft.

In addition to one or more of the features described herein, or as an alternative, further embodiments of the electric power distribution system may include that the another source is a second generator associated with a second gas turbine engine of the aircraft.

In addition to one or more of the features described herein, or as an alternative, further embodiments of the electric power distribution system may include that the diode is arranged in parallel to the diode bypass contactor.

In addition to one or more of the features described herein, or as an alternative, further embodiments of the electric power distribution system may include that the DC essential bus receives the DC electric power from the DC electric power source via an electrical contactor.

In addition to one or more of the features described herein, or as an alternative, further embodiments of the electric power distribution system may include that the DC essential bus receives the DC electric power from the DC electric power source via a fuse.

In another exemplary embodiment, a controller stores instructions to cause the controller to selectively engage a contactor of an electric power distribution system to enable a diode bypass disposed between a direct current (DC) essential bus and a DC electric power source during a first state of operation and to selectively engage the contactor to enable a diode disposed between the DC essential bus and the DC electric power source during a second state of operation. The DC essential bus receives DC electric power from the DC electric power source during the first state of operation and receives the DC electric power from another source during the second state of operation.

In addition to one or more of the features described herein, or as an alternative, further embodiments of the controller may include that the electric power distribution system includes a transformer rectifier unit (TRU) that receives alternating current (AC) electric power from the AC electric power source during the first state of operation.

In addition to one or more of the features described herein, or as an alternative, further embodiments of the controller may include that the electric power distribution system includes the DC electric power source that receives the DC electric power from the TRU which is converted from the AC electric power during the first state of operation.

In addition to one or more of the features described herein, or as an alternative, further embodiments of the controller may include that the electric power distribution system includes the DC essential bus that receives the DC electric power from the DC electric power source during the first state of operation and that receives the DC electric power from the another source during the second state of operation.

In addition to one or more of the features described herein, or as an alternative, further embodiments of the controller may include that the electric power distribution system further includes the alternating current (AC) electric power source that generates the AC electric power.

In addition to one or more of the features described herein, or as an alternative, further embodiments of the controller may include that the electric power distribution system further includes a TRU contactor disposed between the TRU and the DC electric power source.

In addition to one or more of the features described herein, or as an alternative, further embodiments of the controller may include that the another source is a ram air turbine.

In addition to one or more of the features described herein, or as an alternative, further embodiments of the controller may include that the AC electric power source is a first generator associated with a first gas turbine engine of an aircraft.

In addition to one or more of the features described herein, or as an alternative, further embodiments of the controller may include that the another source is a second generator associated with a second gas turbine engine of the aircraft.

In addition to one or more of the features described herein, or as an alternative, further embodiments of the controller may include that the diode is arranged in parallel to the diode bypass contactor.

The above features and advantages, and other features and advantages, of the disclosure are readily apparent from the following detailed description when taken in connection with the accompanying drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments described herein provide for a scheme for controlling a DC essential bus. A DC essential bus is a power bus that provides direct current electric power to systems and/or components considered "critical" to the aircraft, such as flight controls, navigation, radio/communications, and/or the like, including combinations and/or multiples thereof. It is desirable to provide electrical power to such "critical" systems and/or components even in the event of power failure, emergency events, and/or the like. For example, if the generators associated with the aircraft's engines become inoperable, a ram air turbine (RAT) can be used to generate limited power, which can be used to power "critical" systems and/or components. Other systems and/or components not considered to be "critical" (such as passenger entertainment systems and/or the like) may not receive electric power in such cases.

Conventionally, a DC essential bus is able to be fed from a primary or normal power source such as a transformer rectifier unit (TRU), such as via a DC bus, and also fed from an alternate or emergency power source such as an essential TRU, which receives electric power from a primary system generator and/or a RAT.

Figure 1:
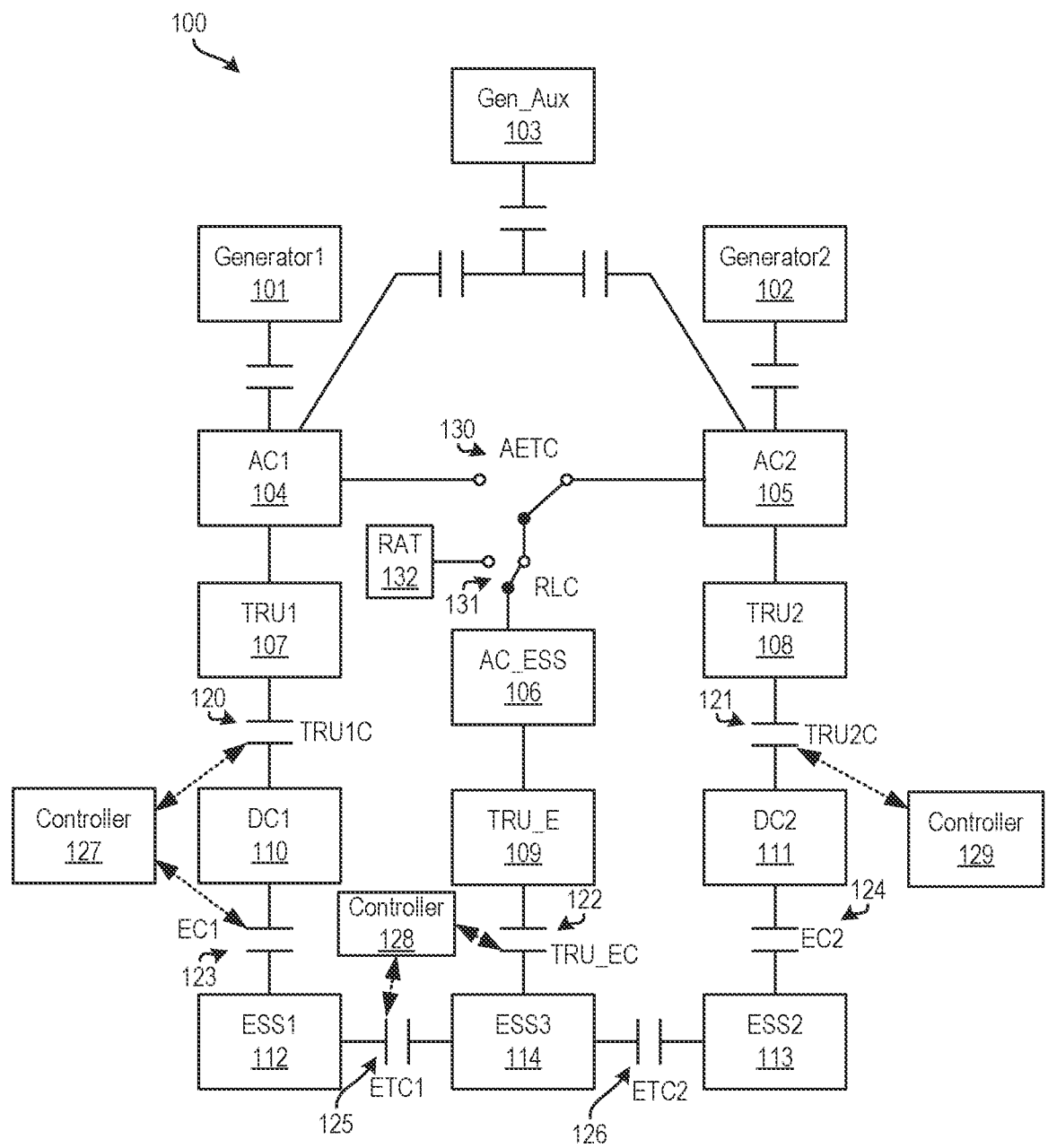
FIG. 1 depicts a circuit diagram of an electric power distribution system according to one or more embodiments described herein.

FIG. 1 depicts a circuit diagram of an electric power distribution system (EPDS) 100 according to one or more embodiments described herein. In this example, generator 1 101, generator 2 102, and/or gen_aux 103 generate electric power through the electric power distribution system 100. Particularly, AC electric power flows from generator 1 101, generator 2 102, and/or gen_aux 103 as shown to one or more AC units AC1 104, AC2 105, and AC_ESS 106. AC electric power can also be generated, in an electrical emergency for example, by RAT 132. AC electric power through portions of the electric power distribution system 100 to/from AC1 104, AC2 105, and AC_ESS 106 can be selectively controlled, via one or more of controllers 127, 128, 129, by switches AETC 130 and RLC 131 as shown. Electric power flows from AC1 104, AC2 105, and AC_ESS 106 to transformer rectifier units TRU1 107, TRU2 108, and TRU_E 109 respectively.

When TRU1 is powered, primary system contactors TRU1C 120 and EC1 123 are closed to power DC ESS 1 112. When TRU1 is not powered, TRU1 C 120 and EC1 123 are opened, and alternate system contactor ETC1 125 is closed to power ESS1 112 from an alternate source (e.g., TRU_E 109 which may be powered by RAT 132 or TRU2 108 if TRU_E 109 is not available). EC1 123 is opened to prevent overloading the alternate power source. To prevent a single controller (e.g., the controller 127) from being able to isolate ESS1 112, control of EC1 123 and ETC1 125 may be distributed to multiple controllers (e.g., multiple of the controller 127 or a dissimilar controller), where a first system controller (e.g., the controller 127) controls EC1 123 and a second system controller (e.g., the controller 128) controls ETC1 125. In another example, ETC1 125 is closed via interlock if EC1 123 opens. A similar arrangement is also possible for the components TRU2 108, DC2 111, and ESS2 113 using TRU2C 121, EC2 124, and ETC2 126. Another similar arrangement is also possible for the components TRU_E109 and ESS3 114 via TRU_EC 122.

According to one or more embodiments described herein, the controller 127, the controller 128, and/or the controller 129 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, one or more of the controllers 127, 128, 129 can be a combination of hardware and programming. The programming can be processor executable instructions stored on a tangible memory, and the hardware can include a processing device for executing those instructions. Thus a system memory can store program instructions that when executed by the processing device implement the features and functions described herein. One or more of the controllers 127, 128, 129 can have the same and/or dissimilar implementations for each implementation in the system.

To account for the case where a primary system failure could result in loss of TRU1 107 but EC1 123 is not automatically opened, some conventional approaches use an AC relay and interlock to open TRU1C 120 and EC1 123 if TRU1 107 input power is lost. However, there may not be sufficient room in the AC system for an AC relay. Another alternative approach is to place a diode between DC1 110 and ESS1 112 that would prevent back feeding from ESS1 112 to DC1 110 if TRU1 107 is lost. However, the use of a diode by itself may preclude float charging of one or more batteries on the ESS DC busses due to voltage drop associated with the diodes. In such arrangements, a separate battery charger may be required. Another alternative approach uses a crew alert system, which provides messages to flight crew, which requires flight crew action to reconfigure the system manually in such an event. However, approaches that rely on flight crew action may be undesirable due to increased workload and may not be sufficient for compliance with certain safety requirements depending on the criticality of the crew alert system message available and loads associated with the essential bus.

Figure 2A:
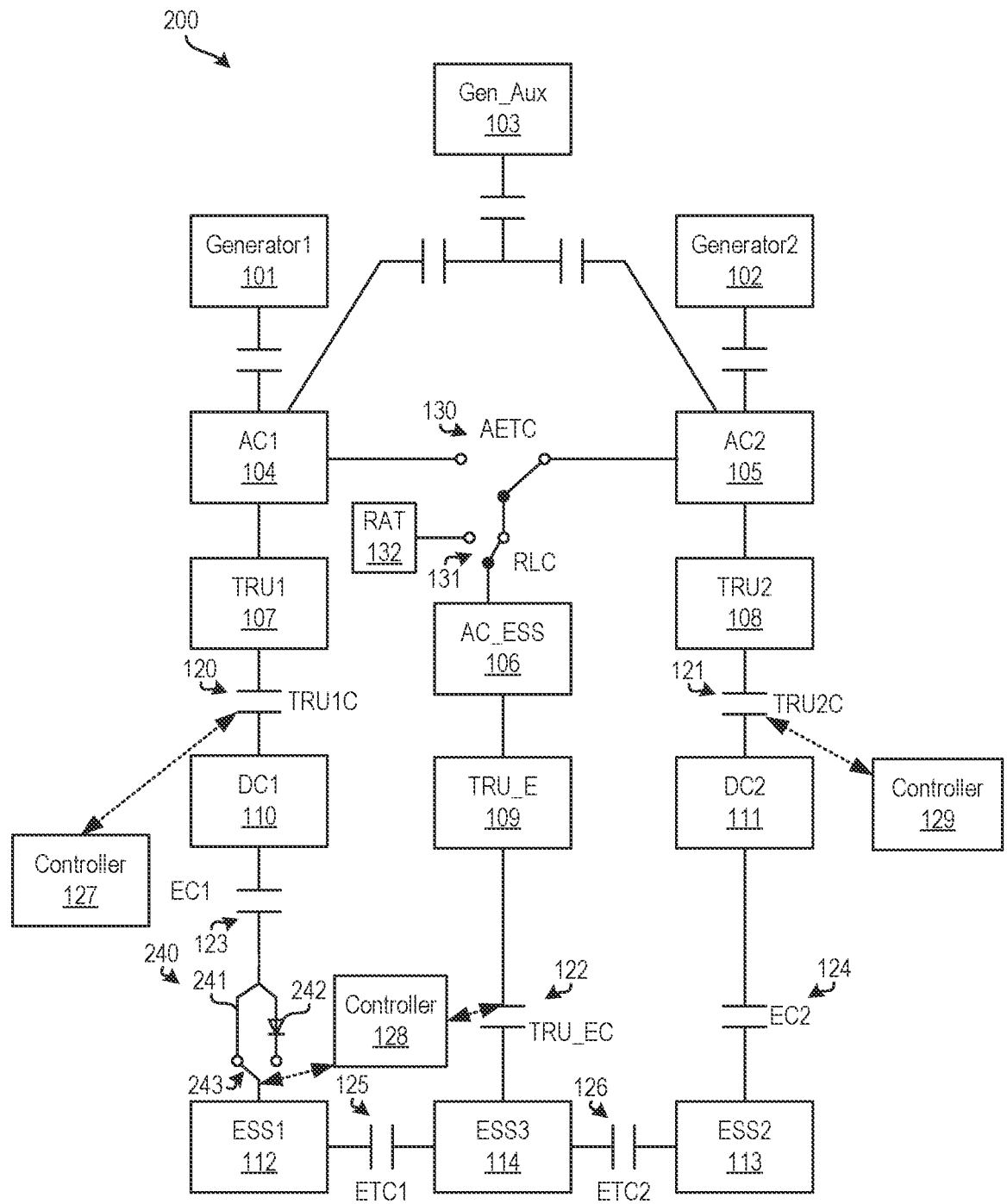
FIGS. 2A and 2B depict circuit diagrams of another electric power distribution system according to one or more embodiments described herein.
Figure 2B:
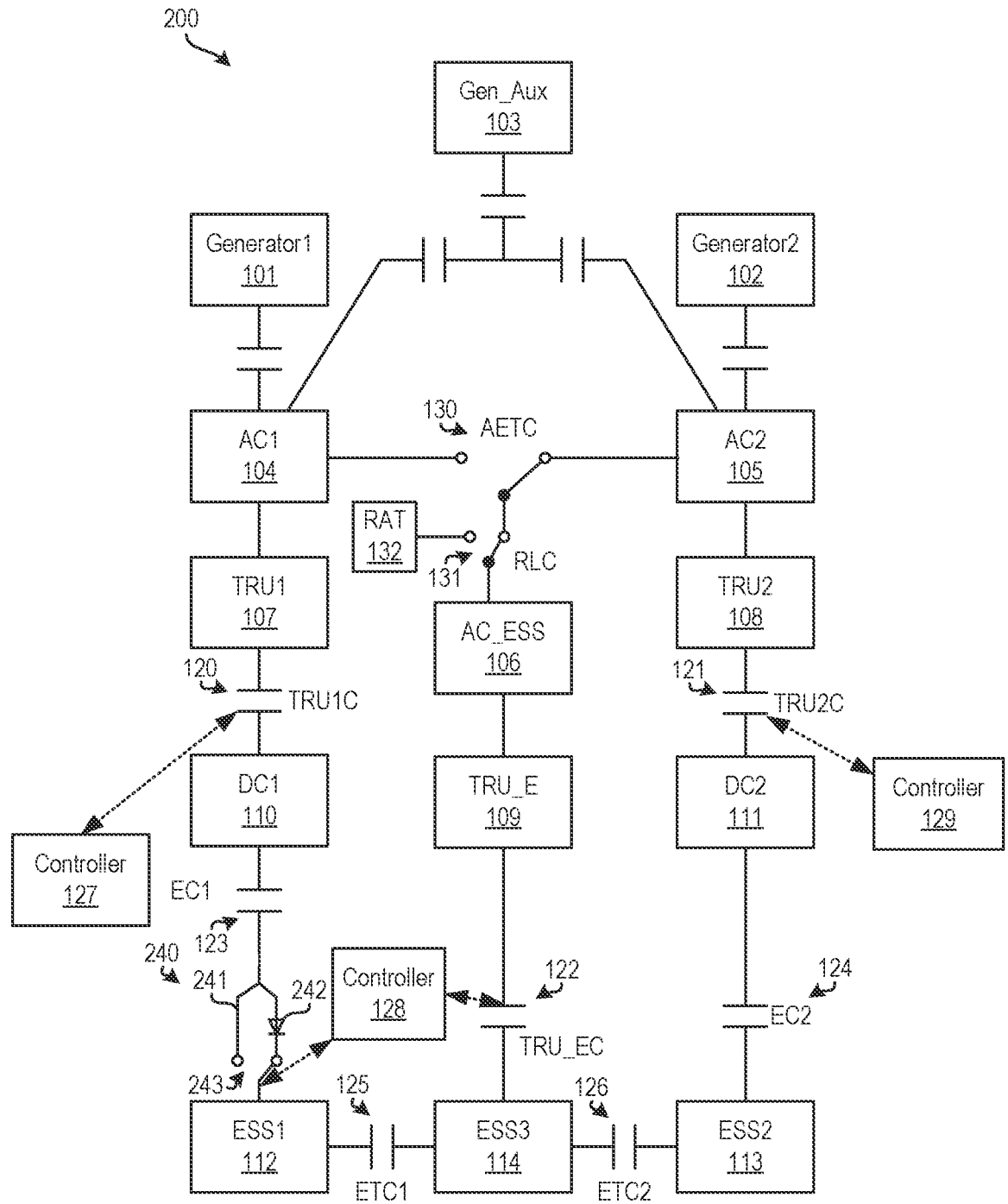

FIGS. 2A and 2B depict circuit diagrams of another electric power distribution system 200 according to one or more embodiments described herein. It this example, the electric power distribution system 200 is modified relative to the electric power distribution system 100 of FIG. 1 to accommodate the scenario where the TRU1 107 fails or is otherwise unavailable, but the primary system controller does not automatically open EC1 123. In the example of FIGS. 2A and 2B, partial control of the primary power feed to ESS1 112 is given to an alterative system controller (e.g., the controller 127). Further, in this example, the EC1 123 is placed in series with a diode-diode bypass arrangement 240 that includes a diode 242 in parallel with a diode bypass 241. Electric power selectively flows through one of the diode 242 or the diode bypass 241, as determined by the contactor 243 (also referred to as a "diode bypass contactor") controlled by the controller 128, based on whether the TRU1 107 is providing power to DC1 110.

In normal operation, where TRU1 is available, the alternate system controller would set the contactor to the no-diode position. If the alternate system controller determines that TRU1 is not available (due to battery discharging indication, low bus voltage, emergency condition indication, etc.), it would switch the contactor to the diode position. The diode would prevent the DC essential bus alternate power source from back-feeding onto DC ESS1 123 if EC1 123 were to fail to open due to the primary system failure. Since this diode path would not be used except in conditions where normal power is not available, this would allow for float charging of the batteries.

Additionally, if the alternate system controller were to fail and erroneously control this new contactor to the diode position, this would still allow the primary system to power the DC ESS bus, preventing the possibility of an alternate system controller failure from resulting in isolation of the DC ESS bus.

FIG. 2A shows the arrangement of electric power flowing from TRU1 107 through TRU1C 120 to DC1 110. The electric power (DC) then passes from DC1 110 to the ESS1 112 via the diode bypass 241 as shown.

FIG. 2B shows the arrangement of electric power stopping flowing from TRU1 107. In such cases, electric power passes to ESS1 112 from another source (e.g., the TRU2 108 via ESS3 114, the TRU_E 109 via ESS 114, etc.). The controller 128 selectively controls the contactor 243 to activate the diode 242 branch of the diode-diode bypass arrangement 240. This presents power to feed back into the DC1 110 (and further, such as to the TRU1 107) from the ESS1 112.

Figure 3:
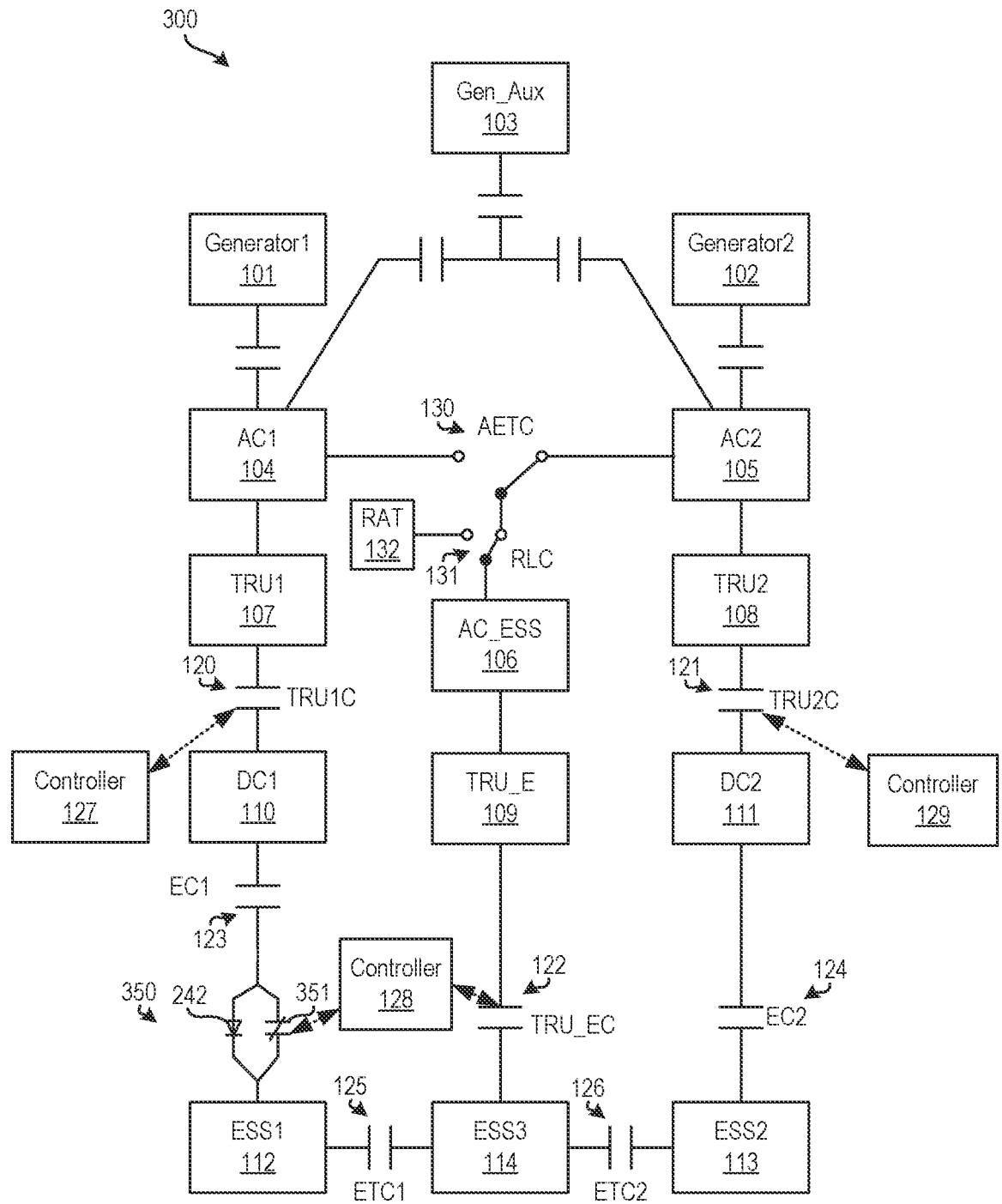
FIG. 3 depicts a circuit diagram of yet another electric power distribution system according to one or more embodiments described herein.

Another potential contactor-diode configuration is shown in FIG. 3. Particularly, FIG. 3 depicts a circuit diagram of yet another electric power distribution system 300 according to one or more embodiments described herein. In this arrangement 350, the diode 242 is shown in parallel with a contactor 351 instead of in one of the pole positions. When TRU1 107 is providing power to DC1 110, the electric power flows through the contactor 351 to ESS1 112. However, when TRU1 107 is not providing power, the contactor 351 is opened, and the diode 242 prevents power back flowing through ESS1 112 to DC1 110.

Another potential configuration replaces EC1 123 with the arrangement 240 or 350 and a fuse (not shown) in series with the arrangement 240 or 350. This removes ability of the controller 127 to remove power from only ESS1 112 without impacting ability to power DC1 110, but the fuse would provide protection for TRU1 107 and DC1 110 against ESS1 112 faults.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A electric power distribution system comprising:
    a transformer rectifier unit (TRU) that receives alternating current (AC) electric power from an AC electric power source during a first state of operation;
    a direct current (DC) electric power source that receives the DC electric power from the TRU which is converted from the AC electric power during the first state of operation;
    a DC essential bus that receives the DC electric power from the DC electric power source during the first state of operation and that receives the DC electric power from another source during a second state of operation; and
    a controller to:
        selectively engage a diode bypass contactor to enable a diode disposed between the DC essential bus and the DC electric power source during the second state of operation, and
        selectively engage the diode bypass contactor to enable a diode bypass disposed between the DC essential bus and the DC electric power source during the first state of operation.

2. The electric power distribution system of claim 1, further comprising:
    the AC electric power source that generates the AC electric power.

3. The electric power distribution system of claim 1, further comprising:
    a TRU contactor disposed between the TRU and the DC electric power source.

4. The electric power distribution system of claim 1, wherein the another source is a ram air turbine.

5. The electric power distribution system of claim 1, wherein the AC electric power source is a first generator associated with a first gas turbine engine of an aircraft.

6. The electric power distribution system of claim 5, wherein the another source is a second generator associated with a second gas turbine engine of the aircraft.

7. The electric power distribution system of claim 1, wherein the diode is arranged in parallel to the diode bypass contactor.

8. The electric power distribution system of claim 1, wherein the DC essential bus receives the DC electric power from the DC electric power source via an electrical contactor.

9. The electric power distribution system of claim 1, wherein the DC essential bus receives the DC electric power from the DC electric power source via a fuse.

10. A controller storing instructions to cause the controller to:
    selectively engage a contactor of an electric power distribution system to enable a diode bypass disposed between a direct current (DC) essential bus and a DC electric power source during a first state of operation; and
    selectively engage the contactor to enable a diode disposed between the DC essential bus and the DC electric power source during a second state of operation,
    wherein the DC essential bus receives DC electric power from the DC electric power source during the first state of operation and receives the DC electric power from another source during the second state of operation.

11. The controller of claim 10, wherein the electric power distribution system comprises:
    a transformer rectifier unit (TRU) that receives alternating current (AC) electric power from the AC electric power source during the first state of operation.

12. The controller of claim 11, wherein the electric power distribution system comprises:
    the DC electric power source that receives the DC electric power from the TRU which is converted from the AC electric power during the first state of operation.

13. The controller of claim 12, wherein the electric power distribution system comprises:
    the DC essential bus that receives the DC electric power from the DC electric power source during the first state of operation and that receives the DC electric power from the another source during the second state of operation.

14. The controller of claim 13, wherein the electric power distribution system further comprises:
    the alternating current (AC) electric power source that generates the AC electric power.

15. The controller of claim 14, wherein the electric power distribution system further comprises:
    a TRU contactor disposed between the TRU and the DC electric power source.

16. The electric power distribution system of claim 10, wherein the another source is a ram air turbine.

17. The controller of claim 14, wherein the AC electric power source is a first generator associated with a first gas turbine engine of an aircraft.

18. The controller of claim 17, wherein the another source is a second generator associated with a second gas turbine engine of the aircraft.

19. The controller of claim 10, wherein the diode is arranged in parallel to the diode bypass contactor.

* * * * *